United States Patent
Madaiah

(10) Patent No.: US 9,590,831 B2
(45) Date of Patent: Mar. 7, 2017

(54) METHOD FOR COMMUNICATION VIA THREE PSEUDO-ORTHOGONAL WAVEFORMS

(71) Applicant: Tejas Networks Ltd., Bangalore (IN)

(72) Inventor: Vinod Kumar Madaiah, Bangalore (IN)

(73) Assignee: TEJAS NETWORKS LTD. (IN)

( * ) Notice: Subject to any disclaimer, the term of this patent is extended or adjusted under 35 U.S.C. 154(b) by 0 days.

(21) Appl. No.: 15/073,942

(22) Filed: Mar. 18, 2016

(65) Prior Publication Data

US 2016/0277226 A1    Sep. 22, 2016

(51) Int. Cl.
*H04L 5/12* (2006.01)
*H04L 27/26* (2006.01)
*H04L 27/34* (2006.01)

(52) U.S. Cl.
CPC .......... *H04L 27/2602* (2013.01); *H04L 27/34* (2013.01)

(58) Field of Classification Search
CPC ............................ H04L 27/2602; H04L 27/34

USPC .......................................... 375/261; 455/101
See application file for complete search history.

(56) References Cited

U.S. PATENT DOCUMENTS

2015/0140940 A1 *  5/2015  Bahng .................... H04B 1/04
                                                           455/101

* cited by examiner

*Primary Examiner* — Daniel Washburn
*Assistant Examiner* — Fitwi Hailegiorgis
(74) *Attorney, Agent, or Firm* — Bracewell LLP; Brad Y. Chin

(57) ABSTRACT

Aspects of the present disclosure aim at providing three pseudo-orthogonal waveforms that can be used for transmitting 3n bits (n bits over each waveform) at a given frequency. Use of such three pseudo-orthogonal waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three pseudo-orthogonal waveforms can in general be used in any application where complex number algebra is used, and can help increase transmission capacity by additional 50%.

10 Claims, 4 Drawing Sheets

METHOD FOR COMMUNICATION VIA THREE PSEUDO-ORTHOGONAL WAVEFORMS

CROSS REFERENCE TO RELATED APPLICATION

This application claims the benefit of and priority to Indian Application No. 1362/CHE/2015 filed on Mar. 19, 2015, entitled "METHOD FOR COMMUNICATION VIA THREE PSEUDO-ORTHOGONAL WAVEFORMS," which is hereby incorporated by reference in their entirety into this application.

BACKGROUND

Field of Invention

Embodiments of the present disclosure generally relate to creation of three pseudo-orthogonal carrier components from a single carrier or carrier frequency or frequency and relate to data transmission using the said created pseudo-orthogonal carrier components or waveforms. In particular, the present disclosure relates to generation and modulation of three pseudo-orthogonal carrier components or waveforms to be used in any circuit including but not limited to OFDM, QAM, among others where carrier-component modulation based on complex number algebra is used for data transmission, e.g. in baseband or passband transmission.

Description of the Related Art

The background description includes information that may be useful in understanding the present invention. It is not an admission that any of the information provided herein is prior art or relevant to the presently claimed invention, or that any publication specifically or implicitly referenced is prior art.

In any modulation scheme employing in-phase and quadrature components, the transmitted modulation signal over a period of duration T may be represented by the expression $M(t)=A*\cos(2pi*t/T)+B*\sin(2pi*t/T)$, or as a similar sum of an alternate pair of orthogonal carrier components or waveforms, wherein the period T is known as a symbol period, and 1/T is defined as the frequency (baseband or passband) or baud rate, FB. Data is communicated by selecting during each symbol period, one of a limited number of permissible (A,B) vectors or symbols. Various quadrature modulation schemes differ in the number, N, of possible symbols and the relative values of the (A, B) vectors corresponding to each possible symbol. Generally, the number, N, of possible symbols is an integer power of 2. Each transmitted symbol then communicates a unique string of $\log_2 N$ bits.

A signal constellation is a graphical representation of the possible symbols for a given modulation scheme. The horizontal and vertical axes correspond to the orthogonal carrier components or simply components of the modulation signal. Each possible symbol is represented by a point at the position of its associated (A, B) coordinates. A 64-point Quadrature Amplitude Modulation (QAM) can, for instance, be represented as an array of 64 points. Since $\log_2(64)=6$, the choice of one particular symbol for transmission during a given symbol period communicates six bits of information. Typically, the bits of information communicated per dimension or axis are equal, which in this example is three bits per axis.

Many other signal constellations are possible. For example, other variants of QAM also have array signal constellations but with various numbers of points. For QPSK (quadrature phase shift key) modulation, the four points of the signal constellation are arranged in a circle having the origin as a center.

QAM transmissions consist of modulating two signals on orthogonal carrier components (such as a sine and a cosine carrier-components) and combining them on the same transmission channel for a single carrier frequency. Since the carrier components are orthogonal, the receiver may recover the two transmitted signals by demodulating the incoming signal with identical sine and cosine carrier components. This method of modulation allows twice as much data to be transmitted on a given channel, per carrier or carrier frequency or frequency, as a standard Amplitude Modulation (AM) approach. In Quadrature Amplitude Modulation (QAM), the signal point is a complex number having a real component and an imaginary component, wherein the real component of the signal is transmitted through a Cosine waveform, and the imaginary component is transmitted using a Sine waveform, wherein Sine and Cosine are orthogonal carrier components or waveforms.

Existing systems allow variable use of four different symbol signal spaces having 8, 16, 32, and 64 transmit points (corresponding to 3, 4, 5 or 6 bits per symbol respectively). In an aspect, if the Sine waveform transmits n bits and Cosine waveform also transmits n bits, the total transmission takes place of 2n bits. In a 16 QAM, Sine wave can transmit 2 bits and Cosine waveform can transmit 2 bits, making it a total of 4 bits being transmitted in one unit of transmission time interval. Similarly, in a 64 QAM, Sine wave will transmit 3 bits and Cosine waveform will transmit 3 bits, making it a total of 6 bits that can be transmitted in one unit of transmission time interval. It may however be desired to send more bits per unit of transmission time interval, which in the current system is restricted to 2n by means of two available orthogonal carrier components or waveforms.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the"

includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

An object of the present disclosure is to provide a transmission scheme that can send more bits per unit of transmission time interval.

Another object of the present disclosure is to provide methods and systems for generating three pseudo-orthogonal carrier components from a single carrier or frequency and using the created pseudo-orthogonal carrier components for modulating the data for transmission over a channel for a given carrier frequency.

Yet another object of the present disclosure is to provide a transmission scheme that can send more bits per unit of transmission time interval, which in the existing systems is restricted to 2n by means of modulating two available orthogonal carrier components or waveforms.

An object of the present disclosure is provides a transmission scheme that can use more than two carrier components or waveforms for modulating the data for transmission.

SUMMARY

Embodiments of the present disclosure provide systems and method of data processing for creation of three pseudo-orthogonal carrier components or waveforms from a single carrier or carrier frequency or frequency and using the said created three pseudo-orthogonal carrier components or waveforms of the present disclosure. Aspects of the present disclosure provide a data transmission scheme that utilizes three pseudo-orthogonal carrier components or waveforms for modulating bits that can be used for transmitting 3n bits (n bits over each waveform) at a given frequency. Such three pseudo-orthogonal carrier components or waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three pseudo-orthogonal carrier components or waveforms can in general be used in any application where carrier component modulation based on complex number algebra is used, and can help increase the data transmission capacity by additional 50%.

According to one embodiment, method of the present disclosure includes use of three sinusoidal or co-sinusoidal waveforms that can be phase shifted by 120 degrees i.e. by $2\pi/3$. In an aspect, using such a configuration of phase shifted sinusoidal or co-sinusoidal waveforms, the test of orthogonality can give a negative number, say −0.5 instead of 0, wherein such a test of orthogonality using negative numbers is referred to as cross-correlation. In an aspect, this technique is similar to pseudo-random numbers used for CDMA, WCDMA, direct-sequence spread spectrum, among other applications/techniques. Therefore we label or call these carrier components as pseudo-orthogonal waveforms or carrier components.

An embodiment of the present disclosure provides a method of data processing or data transmission scheme for creation of three pseudo-orthogonal carrier components from a single carrier or carrier frequency or frequency and using the said created three pseudo-orthogonal carrier components or waveforms. The method can include the steps of receiving a plurality of data streams from one or more sources, and multiplying the plurality of data streams to be transmitted over a carrier using three pseudo-orthogonal waveforms, which are phase shifted by 120 degrees. In an exemplary implementation, the three pseudo-orthogonal waveforms can be sinusoidal or co-sinusoidal waveforms.

In an exemplary implementation, carrier components or waveforms, wherein a first waveform of the three pseudo-orthogonal component or waveform can be created from the said carrier of frequency fusing carrier transformation or formula $\cos(\theta)$, second pseudo-orthogonal component or waveform of the three pseudo-orthogonal waveforms can be created from the same said carrier of frequency fusing carrier transformation or formula $\cos(\theta+2\pi/3)$, and a third pseudo-orthogonal component or waveform of the three waveform can be created from the same said carrier of frequency fusing a carrier transformation or formula $\cos(\theta+4\pi/3)$, wherein $\theta=2\pi ft$ with f being baseband frequency and t being time. In an exemplary implementation, baseband frequency can be 1/T, wherein T is symbol period. In an exemplary implementation, each of the three pseudo-orthogonal carrier components or waveforms are used to modulate or process 'n' bits of information. Though the transformation is provided in the baseband frequency f, by up-converting the frequency to RF frequency one can transmit in passband frequency as well. This RF conversion is well known in art.

Though the aspects of the present disclosure have been explained with respect cosine functions, a person skilled in the art can appreciate that these cosine waveforms can be equivalently be replaced by sine waveform or other pseudo-orthogonal waveforms separated by 120 degrees.

An embodiment of the present disclosure provides a system for data processing that includes a data stream receive block configured to receive a plurality of data streams, and a multiplier module configured to multiply the plurality of data stream for transmission over a carrier using three pseudo-orthogonal carrier components or waveforms, wherein the three pseudo-orthogonal waveforms are separated by 120 degrees. In an exemplary implementation, a first pseudo-orthogonal carrier component or waveform of the three pseudo-orthogonal carrier components or waveforms is $\cos(\theta)$, a second pseudo-orthogonal carrier component or waveform of the three pseudo-orthogonal carrier components or waveforms is $\cos(\theta+2\pi/3)$, and a third carrier component or waveform of the three carrier components or waveforms is $\cos(\theta+4\pi/3)$, wherein each of the three pseudo-orthogonal carrier component or waveform modulate or process n bits of information and wherein $\theta=2\pi ft$ with f being baseband frequency and t being time.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
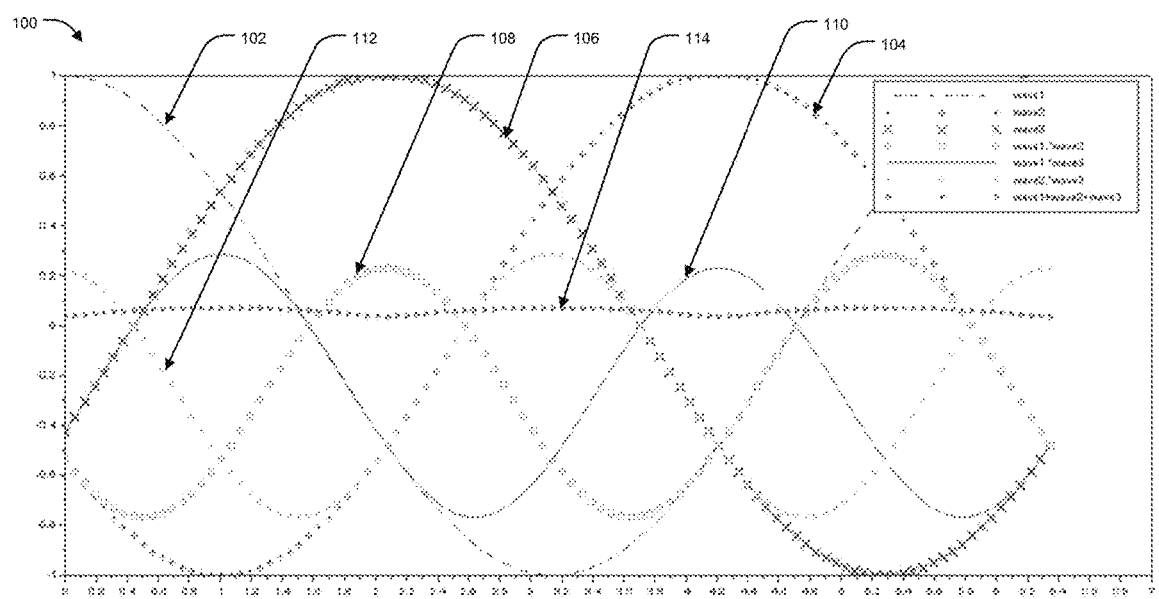
FIG. 1 illustrates an exemplary graphical plot showing Pseudo-orthogonality of the proposed carrier components or waveforms in accordance with an embodiment of the present disclosure.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of generating three pseudo-orthogonal carrier components or waveforms, it should be appreciated that the same has been done merely to illustrate the disclosure in an exemplary manner and any other purpose or function for which the explained structure or configuration can be used, is within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named element.

Embodiments of the present disclosure provide systems and method of data processing for creation of three pseudo-orthogonal carrier components from a single carrier or carrier frequency or frequency and using said created three pseudo-orthogonal carrier components or waveforms of the present disclosure. Aspects of the present disclosure provide a data transmission scheme that utilizes three pseudo-orthogonal carrier component or waveforms that can be used for transmitting 3n bits (n bits over each carrier component or waveform) at a given frequency. Such three pseudo-orthogonal carrier components or waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three pseudo-orthogonal carrier components or waveforms can in general be used in any application where complex number algebra is used, and can help increase the transmission capacity by additional 50%.

According to one embodiment, method of the present disclosure includes use of three sinusoidal or co-sinusoidal waveforms that can be phase shifted by 120 degrees i.e. by $2\pi/3$. In an aspect, using such a configuration of phase shifted sinusoidal or co-sinusoidal waveforms, the test of Orthogonality can give a negative number, say −0.5 instead of 0, wherein such a test of Orthogonality using negative numbers is referred to as cross-correlation. In an aspect, this technique is similar to pseudo-random numbers used for CDMA, WCDMA, direct-sequence spread spectrum, among other applications/techniques. Therefore we label or call these carrier components as pseudo-orthogonal waveforms or carrier components.

An embodiment of the present disclosure provides a method of data processing or data transmission scheme using three pseudo-orthogonal carrier components or waveforms. The method can include the steps of receiving a plurality of data streams from one or more sources, and multiplying the plurality of data streams to be transmitted over a carrier using three pseudo-orthogonal waveforms, which are phase shifted by 120 degrees. In an exemplary implementation, the three carrier components or waveforms, wherein a first pseudo-orthogonal waveforms can be sinusoidal carrier component or co-sinusoidal waveforms.

In an exemplary implementation, first waveform of the three pseudo-orthogonal waveforms can be created for the given carrier of frequency fusing a carrier transformation or formula $\cos(\theta)$, second pseudo-orthogonal carrier component or waveform of the three pseudo-orthogonal carrier components or waveforms can be created for the given carrier of frequency fusing a carrier transformation or formula $\cos(\theta+2\pi/3)$ and a third carrier component or waveform of the three carrier components or waveforms can be created for the given carrier of frequency f using a carrier transformation or formula $\cos(\theta+4\pi/3)$, wherein $\theta=2\pi ft$ with f being baseband frequency and t being time. In an exemplary implementation, baseband frequency can be 1/T, wherein T is symbol period. In an exemplary implementation, each of the three pseudo-orthogonal carrier components or waveforms modulate or process 'n' bits of information.

Though the aspects of the present disclosure have been explained with respect to cosine functions, a person skilled in the art can appreciate that these cosine carrier component or waveforms can be equivalently be replaced by sine carrier component or waveform or other pseudo-orthogonal carrier component or waveforms separated by 120 degrees.

An embodiment of the present disclosure provides a system for data processing that includes a data stream receive block configured to receive a plurality of data streams, and a multiplier module configured to multiply the plurality of data stream for transmission over a carrier using three pseudo-orthogonal carrier component or waveforms, wherein the three pseudo-orthogonal waveforms are separated by 120 degree. In an exemplary implementation, a first pseudo-orthogonal carrier component or waveform of the three pseudo-orthogonal carrier components or waveforms is $\cos(\theta)$, a second pseudo-orthogonal carrier component or waveform of the three pseudo-orthogonal carrier components or waveforms is $\cos(\theta+2\pi/3)$, and a third carrier component or waveform of the three pseudo-orthogonal carrier components or waveforms is $\cos(\theta+4\pi/3)$, wherein each of the three pseudo-orthogonal carrier component or waveform modulate or process n bits of information and wherein $\theta=2\pi ft$ with f being baseband frequency and t being time.

Following set of equations prove that the proposed three waveforms as described above are pseudo-orthogonal to each other:

$$\int_0^{2\pi} (\cos(\theta))^2 d\theta = \pi > 0 \qquad 1.$$

$$\int_0^{2\pi} (\cos(\theta+2\pi/3))^2 d\theta = \pi > 0 \qquad 2.$$

$$\int_0^{2\pi} (\cos(\theta+4\pi/3))^2 d\theta = \pi > 0 \qquad 3.$$

$$\int_0^{2\pi} (\cos(\theta))(\cos(\theta+2\pi/3)) d\theta = -\pi/2 \qquad 4.$$

$$\int_0^{2\pi} (\cos(\theta))(\cos(\theta+4\pi/3)) d\theta = -\pi/2 \qquad 5.$$

$$\int_0^{2\pi} (\cos(\theta+2\pi/3))(\cos(\theta+4\pi/3)) d\theta = -\pi/2 \qquad 6.$$

As one may appreciate, two carrier components or waveforms are said to be orthogonal if their inner product integral$(x(t)*y(t))dt$ have zero value over the time interval of interest. Pseudo-orthogonal properties of two carrier components or waveforms enable transmission of data over a single channel using plurality of pseudo-orthogonal carrier components or waveforms and hence increased efficiency of the channel or given frequency.

FIG. 1 illustrates an exemplary graphical plot 100 showing Pseudo-orthogonality of the proposed carrier components or waveforms (Carrier component or waveform 1, Carrier component or waveform 2, and Carrier component or waveform 3) in accordance with an embodiment of the present disclosure. As shown, carrier component or waveform 102 represents first carrier component or waveform (Carrier component or waveform 1=$\cos(\theta)$), carrier component or waveform 104 represents second carrier component or waveform (Carrier component or waveform 2=$\cos(\theta+2\pi/3)$), and carrier component or waveform 106 represents third carrier component or waveform (Carrier component or waveform 3=$\cos(\theta+4\pi/3)$).

In different implementation, the three carrier component or waveforms can be represented using sine wave functions. For example, carrier component or waveform 1 can be $\sin(\theta)$, carrier component or waveform 2 can be $\sin(\theta+2\pi/3)$, and carrier component or waveform 3 can be $\sin(\theta+4\pi/3)$. As one may appreciate each of the three pseudo-orthogonal carrier components or waveforms are separated by 120 degrees.

As shown in FIG. 1, waveform 108 shows mixing or multiplication between carrier component or waveforms 102 and 104, waveform 110 shows mixing or multiplication between carrier component or waveforms 102 and 106, and waveform 112 shows mixing or multiplication between carrier component or waveforms 104 and 106. Finally, carrier component or waveform 114 shows addition of the carrier component or waveforms 102, 104, and 106. As can be seen in the FIG. 1, the three carrier component or waveforms as proposed in the present disclosure are pseudo-orthogonal and give a negative number, say −0.5 instead of 0, when pseudo-orthogonality test is performed.

Figure 2:
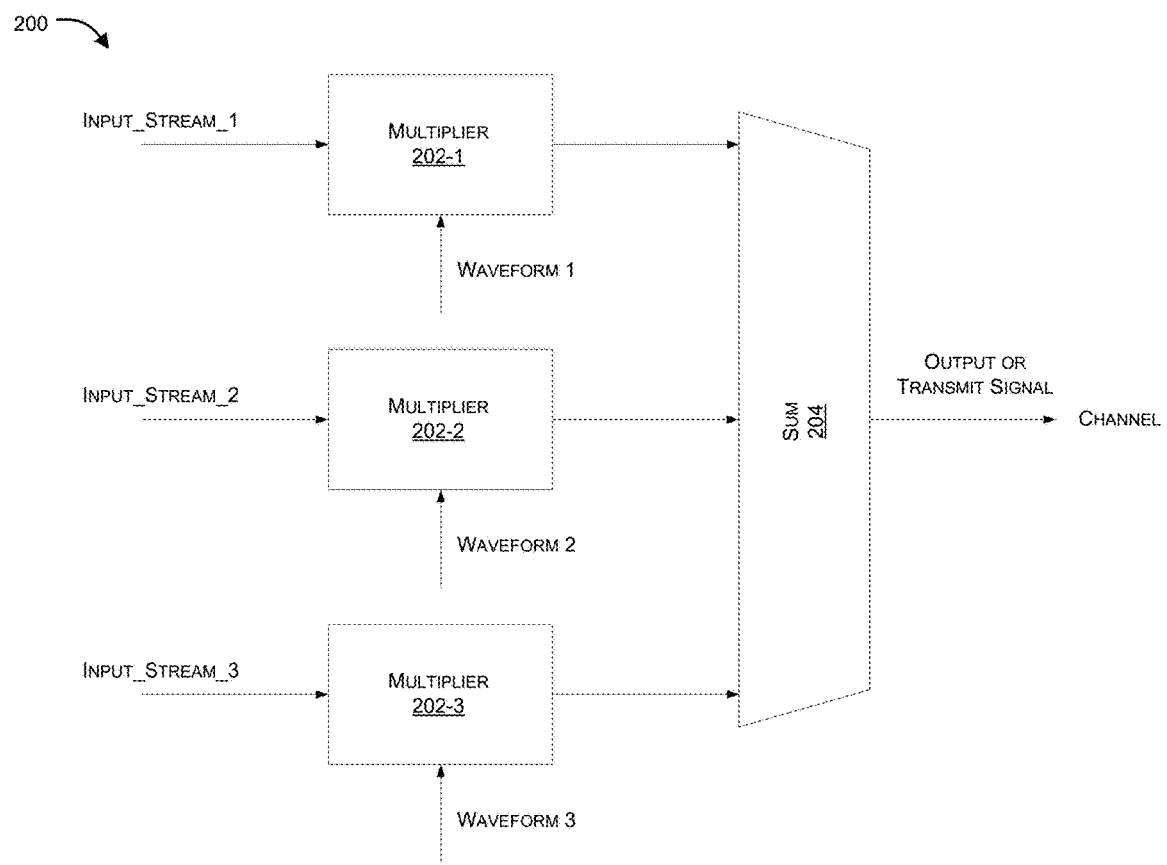
FIG. 2 illustrates an exemplary transmission block 200 of a communication system that can be configured to use three pseudo-orthogonal carrier components or waveforms in accordance with an embodiment of the present disclosure.

FIG. 2 illustrates an exemplary transmission block 200 of a communication system that can be configured to use three pseudo-orthogonal carrier components or waveforms in accordance with an embodiment of the present disclosure. As can be seen, in the proposed communication system that uses the three pseudo-orthogonal carrier components or waveforms, three input streams, each of say n bits can be received at a modulator or mixer or multiplier (202-1, 202-2, and 202-3, collectively referred to as multiplier 202 hereinafter) that multiplies each input stream such as stream_1, stream_2, and stream_3 with one of the three proposed carrier component or waveforms (Carrier component or waveforms 1, Carrier component or waveform 2, and Carrier component or waveform 3). In an aspect, the input streami can correspond to i-th dimension of QAM signal constellation or ⅓ of the bits to be transmitted. According to one embodiment, output from the three multipliers can be summed at 304, and then can be transmitted to the receiver through one or more channels.

In an embodiment, the present disclosure provides a method and a circuit for spectrally efficient transmission of digital signals. The above-mentioned transmission block 200 can be configured in a transmitter that encodes multiple data bits into multiple symbols under a conventional coding scheme, and, for each of these symbols, modulates the symbol for a time interval onto a corresponding one of a number of pseudo-orthogonal carrier component or waveforms. In another aspect, the proposed invention relates generally to multiple access systems, and in particular to a wireless multiple access networks utilizing sets of pseudo-orthogonal carrier components or waveforms for separation of multiple simultaneously transmitting users. Furthermore, the present disclosure has been made in an effort to provide a device and method having advantages of performing fast data transmission and reception in a bus form between several devices through a simple serial connection structure without complicated connections.

In an aspect, an exemplary embodiment of the present invention provides a first communication device that can include a symbol generator configured to modulate data to generate a first data symbol; and a signal generator configured to generate a first signal using a first signal carrier component or waveform allocated among a plurality of mutually pseudo-orthogonal signal carrier components or waveforms and the first data symbol, and output the first signal to a serial line connected to a second communication device. In an aspect, a serial line may add up the first signal and a second signal output from the second communication device to mix the first and second signals, wherein the second signal may be generated by using a second signal carrier component or waveform pseudo-orthogonal to the first signal carrier component or waveform among the plurality of signal carrier component or waveforms.

The signal generator may include a first generator configured to generate the first signal carrier component or waveform by cyclic-shifting a basic signal carrier component or waveform among the plurality of carrier component or waveforms by a first shift value corresponding to the first signal carrier component or waveform. The signal generator may further include a second generator configured to generate the first signal by multiplying the first data symbol by the first signal carrier component or waveform. The mixed signal mixed by the serial line may include: a first identifier identifying a device to receive a first packet corresponding to the first signal; length information indicating a length of the first packet; and a second identifier identifying a device transmitting the first packet. The proposed communication device may further include a reception processor configured to receive the mixed signal from the serial line and obtain data whose destination is the first communication device from the mixed signal.

Another embodiment of the present invention provides a first communication device that may include a carrier component or waveform allocator configured to manage a plurality of mutually pseudo-orthogonal signal carrier component or waveforms, and allocate a first signal carrier component or waveform among the plurality of signal carrier component or waveforms to a second communication device among a plurality of communication devices connected to a serial line; and a signal generator configured to generate a first signal by using allocation information of the first signal carrier component or waveform and a second signal carrier component or waveform among the plurality of signal carrier component or waveforms, and output the first signal to the serial line.

Figure 3:
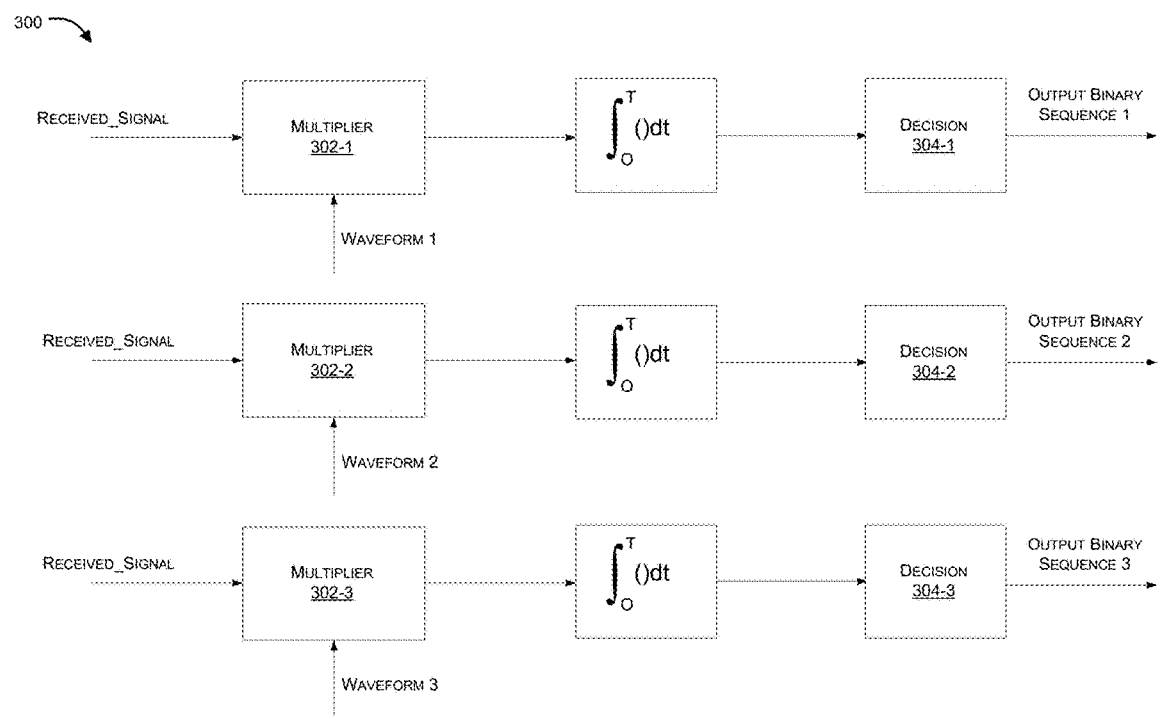
FIG. 3 illustrates an exemplary receiver block of a communication system in accordance with an embodiment of the present disclosure.

FIG. 3 illustrates an exemplary receiver block 300 of a communication system in accordance with an embodiment of the present disclosure. As shown in FIG. 3, at a receiver side, a signal can be received at a multiplier 302-1, 302-2, and 302-3, collectively referred to as receiver multiplier 302 hereinafter, which can demodulate or process each received signal with one of the three pseudo-orthogonal carrier components or waveforms (Carrier component or waveform 1, Carrier component or waveform 2, and Carrier component or waveform 3). According to one embodiment, time, frequency and phase synchronization can be performed before the multiplication step. Post multiplication, output from each multiplier 302 can be integrated over a time interval of T, wherein the output from each integrator can be compared with a set of threshold values say $V_{th}$ at the decision blocks 304-1, 304-2, and 304-3. For instance, if the output is more than $V_{th}$, the decision can be made in favor of symbol 1, else the decision can be made in favor of symbol 0.

According to one embodiment, a threshold can be set for detection of zero bit (assuming that bit zero is transmitted as positive voltage) as range of values from "plus-infinity" to "epsilon". Similarly, another threshold can be set for detection of bit one (assuming that bit one is transmitted as negative voltage) as range of values from "epsilon" to "minus-infinity", wherein "epsilon" is a small negative number e.g. −0.5. That is if the correlation value is 0, pi or 2*pi, then its bit is 0, and if the correlation value is −pi or −2*pi, then its bit is 1. So threshold, $V_{th}$, for detection of transmitted bit, is say −0.50 (i.e., minus 0.5)

One should appreciate the present disclosure is not limited to QAM in any manner. One should also appreciate that off the shelf components including but not limited to de-multiplexer, multiplexer, correlator, decision device, multiplier, and integrator can be incorporated.

Figure 4:
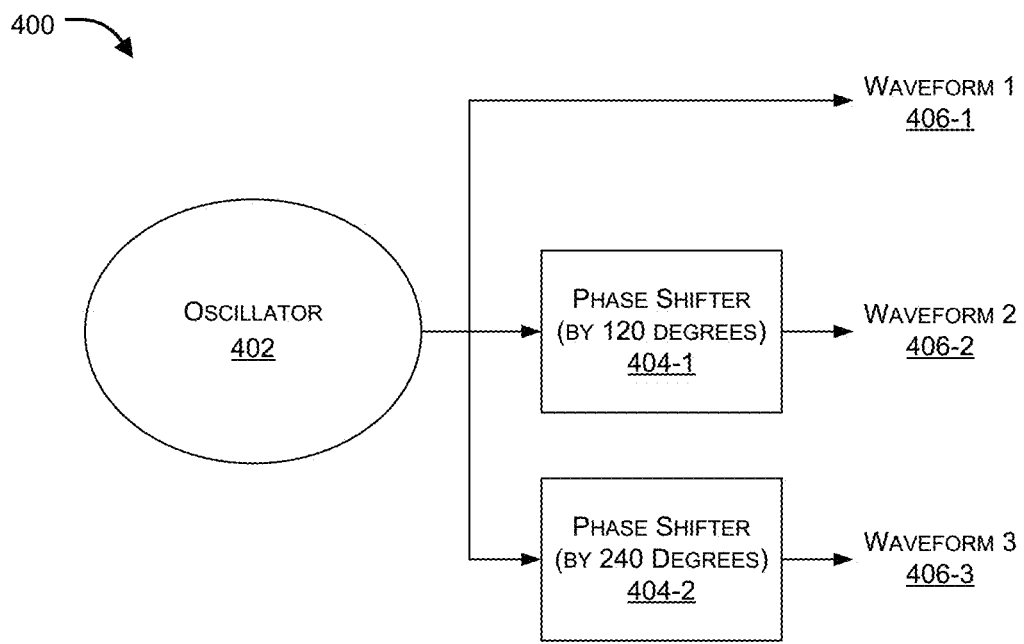
FIG. 4 illustrates an exemplary block diagram of orthogonal waveforms generator that can be used by the system to generate orthogonal carrier components or waveforms from a single carrier or carrier frequency in accordance with an embodiment of the present disclosure.

FIG. 4 illustrates an exemplary block diagram of pseudo-orthogonal waveform generator that can be used by the system to generate pseudo-orthogonal waveforms from a single carrier or carrier frequency in accordance with an embodiment of the present disclosure. The orthogonal waveform generator 400 can transform a single carrier of frequency "f" into three pseudo-orthogonal waveforms. In an exemplary implementation, an oscillator 402 can be configured to generate a sinusoid or cosinusoid of frequency "f". The carrier of frequency "f" can pass through arrangement of phase shifters to generate a pseudo-orthogonal waveform 1 406-1, a pseudo-orthogonal waveform 2 406-2, and a pseudo-orthogonal waveform 406-3. As one may appreciate, waveform 1 406-1, waveform 2 406-2, and waveform 3 406-3 are pseudo-orthogonal waveforms of the carrier of frequency "f". In an exemplary implementation, waveform 1 406-1 can be the sinusoid or cosinusoid generated directly by the oscillator 402, waveform-2 406-2 can be generated by a phase shifter 404-1 by phase shifting the sinusoid or cosinusoid signal, in present example cosinusoid signal by 120 degrees, and the waveform-3 406-3 can be generated by phase shifter 404-2 by shifting the cosinusoid by 240 degrees.

In an aspect therefore, the proposed three pseudo-orthogonal waveforms are generated for coherent transmission and reception of symbols, wherein the waveforms have cross-correlation property that can be used for Modulation and Demodulation. The proposed system also improves transmission capability by 50% and hence improves 50% throughput efficiency. In an aspect, the three proposed waveforms do not have a DC component and the invention generates three waveforms at Modulator and Demodulator (Modem). The proposed subject matter can take three streams of symbols for Modulation and Demodulation because it is based on three waveforms.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

ADVANTAGES OF THE INVENTION

The present disclosure provides a transmission scheme can send more bits per unit of transmission time interval.

The present disclosure provides a method and system for pseudo-orthogonal data transmission over a given frequency.

The present disclosure provides a transmission scheme that can send more bits per unit of transmission time interval, which in existing systems is restricted to 2n by means of two available orthogonal carrier components or waveforms.

The present disclosure provides a transmission scheme that can use more than two orthogonal carrier components or waveforms for data transmission.

I claim:

1. A system for data transmission comprising:
    a data stream receive block configured to receive a first data stream, a second data stream, and a third data stream; and
    a multiplier module configured to multiply, by means of one or more multipliers, the first data stream with a first pseudo-orthogonal waveform, the second data stream with a second pseudo-orthogonal waveform, and the third data stream with a third pseudo-orthogonal waveform for transmission over a carrier using three pseudo-orthogonal waveforms, wherein a first pseudo-orthogonal waveform is $\cos(\theta)$, the second pseudo-orthogonal waveform is $\cos(\theta+2\pi/3)$, and the third pseudo-orthogonal waveform is $\cos(\theta+4\pi/3)$, wherein $\theta=2\pi ft$ with f being baseband carrier frequency and t being time.

2. The system of claim 1, wherein each of the first data stream, a second data stream, and a third data stream carries n bits, enabling 3n bits to be transmitted.

3. The system of claim 1, wherein the system comprises three multipliers, and wherein output signal from each multiplier module is taken to a summer to sum the three output signals before sending the summed signal to a receiver.

4. The system of claim 1, wherein post the multiplier module, output from each of the one or more multipliers is integrated, using respective integrators, over a time interval T, and wherein output from each integrator is compared with a set of threshold values.

5. The system of claim 4, wherein if the output is more than the respective threshold value, decision is made in favor of Symbol 1, else in favor of Symbol 0.

6. The system of claim 4, wherein at least one of the set of threshold values is defined for detection of bit zero.

7. The system of claim 4, wherein at least one of the set of threshold values is defined for detection of bit one.

8. The system of claim 1, wherein the three pseudo-orthogonal waveforms are used for any or a combination of Quadrature Amplitude Modulation (QAM), Orthogonal frequency-division multiplexing (OFDM), Quadrature Phase Shift Keying (QPSK), or Binary Phase Shift Keying (BPSK).

9. A system for data transmission comprising:
a data stream receive block configured to receive a first data stream, a second data stream, and a third data stream; and
a multiplier module configured to multiply, by means of one or more multipliers, the first data stream with a first pseudo-orthogonal waveform, the second data stream with a second pseudo-orthogonal waveform, and the third data stream with a third pseudo-orthogonal waveform for transmission over a carrier using three pseudo-orthogonal waveforms, wherein a first pseudo-orthogonal waveform is $\sin(\theta)$, the second pseudo-orthogonal waveform is $\sin(\theta+2\pi/3)$, and the third pseudo-orthogonal waveform is $\sin(\theta+4\pi/3)$, wherein $\theta=2\pi ft$ with f being baseband carrier frequency and t being time.

10. A method for data transmission comprising the steps of:
receiving, at a transmitting device, a first data stream, a second data stream, and a third data stream; and
multiplying, at the transmitting device, by means of one or more multipliers, the first data stream with a first pseudo-orthogonal waveform, the second data stream with a second pseudo-orthogonal waveform, and the third data stream with a third pseudo-orthogonal waveform for transmission over a carrier using the three pseudo-orthogonal waveforms, wherein the first pseudo-orthogonal waveform is $\cos(\theta)$, the second pseudo-orthogonal waveform is $\cos(\theta+2\pi/3)$, and the third waveform is $\cos(\theta+4\pi/3)$, wherein $\theta=2\pi ft$ with f being baseband frequency and t being time.

* * * * *

UNITED STATES PATENT AND TRADEMARK OFFICE
CERTIFICATE OF CORRECTION

PATENT NO. : 9,590,831 B2  
APPLICATION NO. : 15/073942  
DATED : March 7, 2017  
INVENTOR(S) : Vinod Kumar Madaiah Page 1 of 1

It is certified that error appears in the above-identified patent and that said Letters Patent is hereby corrected as shown below:

On the Title Page

Item (30), the Foreign Application Priority Data, insert -- March 19, 2015 (IN) 1362/CHE/2015 --.

Signed and Sealed this  
Thirtieth Day of May, 2017

Michelle K. Lee  
*Director of the United States Patent and Trademark Office*